United States Patent
Kim et al.

(10) Patent No.: US 9,843,527 B2
(45) Date of Patent: Dec. 12, 2017

(54) METHOD FOR PROCESSING DATA AND AN ELECTRONIC DEVICE THEREOF

(71) Applicant: Samsung Electronics Co., Ltd., Gyeonggi-do (KR)

(72) Inventors: Jin-Yup Kim, Gyeonggi-do (KR); Geon-Soo Kim, Gyeonggi-do (KR); Kyoung-Youp Park, Gyeonggi-do (KR); Jun-Hwan An, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 399 days.

(21) Appl. No.: 14/538,616

(22) Filed: Nov. 11, 2014

(65) Prior Publication Data

US 2015/0131469 A1 May 14, 2015

(30) Foreign Application Priority Data

Nov. 11, 2013 (KR) .................. 10-2013-0136064

(51) Int. Cl.
*H04L 12/805* (2013.01)

(52) U.S. Cl.
CPC .................. *H04L 47/365* (2013.01)

(58) Field of Classification Search
None
See application file for complete search history.

(56) References Cited

U.S. PATENT DOCUMENTS

| 8,295,197 B2 | 10/2012 | Yoon et al. | |
|---|---|---|---|
| 2004/0001444 A1* | 1/2004 | Sadot et al. | H04L 47/10 370/252 |
| 2009/0144424 A1* | 6/2009 | Takeda et al. | H04L 12/5693 709/226 |
| 2012/0176912 A1 | 7/2012 | Kwag | |

FOREIGN PATENT DOCUMENTS

KR  10-2009-0010416  1/2009

OTHER PUBLICATIONS

Luckie, M., Cho, K., & Owens, B. "Inferring and debugging path MTU discovery failures." In Proceedings of the 5th ACM SIGCOMM conference on Internet Measurement. USENIX Association. Oct. 25, 2005.*

* cited by examiner

*Primary Examiner* — Robert M Morlan

(57) ABSTRACT

An apparatus and a method are provided for transmitting data in an electronic device. A method for processing data in an electronic device includes in network connection, determining whether to send a packet of a first Maximum Transmission Unit (MTU) value that is preset, a destination node, responsive to the packet of the first preset MTU value not being transmitted to the destination node, measuring an optimal MTU value in an Internet Protocol (IP) layer or an application layer, and changing the first preset MTU to the measured optimal MTU value.

17 Claims, 12 Drawing Sheets

METHOD FOR PROCESSING DATA AND AN ELECTRONIC DEVICE THEREOF

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 11, 2013, and assigned Serial No. 10-2013-0136064, the entire disclosure of which is hereby incorporated by reference.

TECHNICAL FIELD

The present disclosure relates generally to an apparatus and a method for transmitting data in an electronic device.

BACKGROUND

In recent, electronic devices having a convergence function for one or more functions are growing.

Further, mobile terminals, the so-called 'smart phones', are dominant among the electronic devices. The mobile terminal includes a large display module of a touch type. In addition to a basic communication function with the other party, the mobile terminal includes a high-pixel camera module for capturing a still picture and a moving picture. The mobile terminal may play multimedia contents such as music and video, and surf the web by accessing a network. Such a mobile terminal is advancing with a high-performance processor to serve various convergence functions at a higher speed and to achieve remarkable development such that its main communication function with the other party is regarded as the additional function.

The electronic device may provide a user with various data services by communicating data over a wireless communication network.

The electronic device may communicate the data with a packet of a Maximum Transmission Unit (MTU) size. The electronic device may transmit the packet fragmented in a predefined size, to a destination node over the network.

The electronic device may provide various data services to the user by communicating the data over the wireless communication network.

The electronic device may communicate the data over a plurality of networks, for example, various communication networks such as Code Division Multiple Access (CDMA) 2000, Wideband CDMA (WCDMA), High Speed Downlink Packet Access (HSDPA), Wireless Broadband Internet (WI-BRO), Wireless Fidelity (WiFi), Worldwide Interoperability for Microwave Access (WiMAX), and Long Term Evolution (LTE).

The electronic device may perform the data communication based on the MTU, and use a fixed MTU value for compatibility with various wireless communication networks. For example, the electronic device may set the hard-coded MTU value with 1500 bytes.

However, some areas or some providers allow the network use through the smaller MTU than the hard-coded MTU in the electronic device. In this situation, the electronic device needs to change to the MTU value required by the provider using firmware update for the network use.

When the electronic device of the small MTU intends to use the network supporting the large MTU, it needs to re-change the MTU value through the firmware update.

SUMMARY

To address the above-discussed deficiencies, it is a primary object to provide a method for processing data in an electronic device includes in network connection, determining whether to send a packet of a first Maximum Transmission Unit (MTU) value that is preset to a destination node; responsive to the packet of the first preset MTU value not being transmitted to the destination node, measuring an optimal MTU value in an Internet Protocol (IP) layer or an application layer; and changing the first preset MTU to the measured optimal MTU value.

According to another aspect of the present disclosure, an electronic device includes a memory for storing a Maximum Transmission Unit (MTU) value; a communication part for sending a packet of a first preset MTU value to an intermediate node and receiving a response of the packet from the intermediate node; and a processor for controlling to send a packet of the first MTU value that is preset, to a destination node in network connection, responsive to the packet of the first preset MTU value not being transmitted to the destination node, to measure an optimal MTU value in an Internet Protocol (IP) layer, and to change the first preset MTU to the measured optimal MTU value.

According to yet another aspect of the present disclosure, a computer-readable recording medium records a program in an electronic device to execute operations for determining whether to send a packet of a first Maximum Transmission Unit (MTU) value that is preset to a destination node in network connection, responsive to the packet of the first preset MTU value not being transmitted to the destination node, measuring an optimal MTU value in an Internet Protocol (IP) layer or an application layer, and changing the first preset MTU to the measured optimal MTU value.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
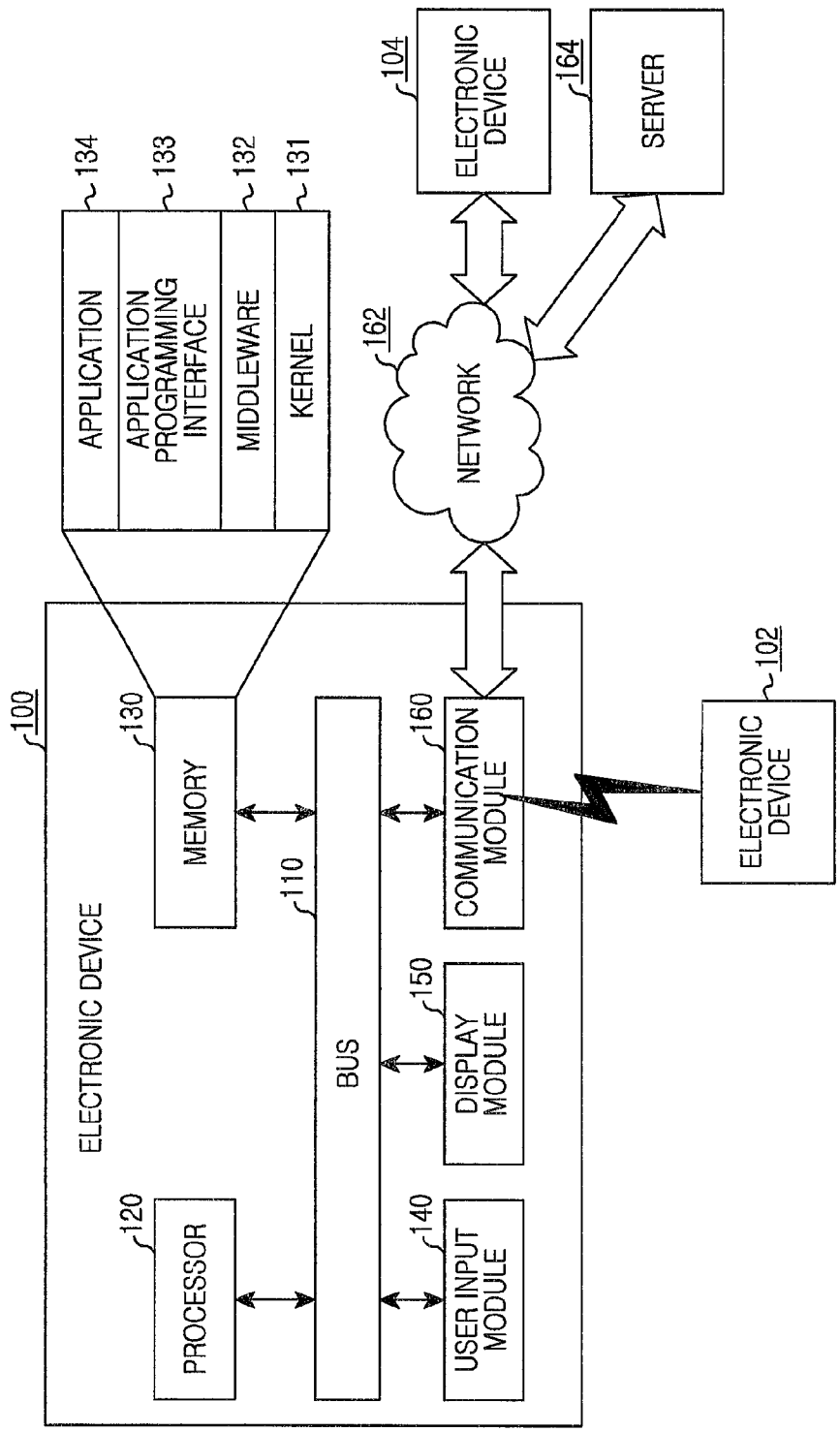
FIG. 1 illustrates a block diagram of a network environment of an electronic device according to an example embodiment of the present disclosure.

FIGS. 1 through 9D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an electronic device or an auxiliary electronic device may include one or more of a smart phone, a tablet Personal Computer (PC), a mobile phone, a video phone, an e-Book reader, a desktop PC, a laptop PC, a netbook computer, a Personal Digital Assistant (PDA), a Portable Multimedia Player (PMP), an MP3 player, a mobile medical device, a camera, a wearable device, an electronic clock, a wrist watch, a refrigerator, an air conditioner, an vacuum cleaner, an artificial intelligence robot, a television (TV), a Digital Video Disk (DVD) player, an audio system, an oven, a microwave oven, a washer, an air cleaner, medical equipment (e.g., Magnetic Resonance Angiography (MRA), Magnetic Resonance Imaging (MRI), Computed Tomography (CT), X-ray machine, smayner), a navigation device, a Global Positioning System (GPS) receiver, an Event Data Recorder (EDR), a Flight Data Recorder (FDR), a set-top box, a TV box (e.g., Samsung HomeSync™), an electronic dictionary, an in-vehicle infotainment device, an electronic equipment for ship (e.g., marine navigation system, gyrocompass), avionics, a security device, a camcorder, a game console, part of furniture or a building/structure including the electronic device, an electronic board, an electronic signature receiving device, and projector.

It is apparent that the electronic device of the present disclosure is not limited to those devices.

FIG. 1 illustrates a block diagram of a network environment of an electronic device according to an example embodiment of the present disclosure.

Referring to FIG. 1, the electronic device 100 may include a bus 110, a processor 120, a memory 130, a user input module 140, a display module 150, and a communication module 160.

The bus 110 may be a circuit for interlinking the components and conveying communication (e.g., control messages) between the components.

The processor 120 may receive an instruction from the other components (e.g., the memory 130, the user input module 140, the display module 150, and the communication module 160) 100 via the bus 110, interpret the received instruction, and perform an operation or a data processing according to the interpreted instruction.

The processor 120 may monitor a network flow using packet transmission, for example, detect a connection error occurs due to a Maximum Transmission Unit (MTU). For example, the processor 120 may process to monitor the network flow with a first MTU packet. Herein, the first MTU may be the largest MTU size available in the electronic device. After an Internet Protocol (IP) is allocated for the network connection, the processor 120 may perform handshaking. When successfully connecting to the network, the processor 120 may check the connection error due to the MTU by determining whether to retransmit the packet of the first MTU packet transmission.

When the network connection error occurs and a response for path MTU discovery is not received, the processor 120 may process to obtain an optimal MTU by discovering the path MTU in an IP layer or an application layer.

The processor 120 may process to change the preset MTU to the optimal MTU identified in the IP layer or the application layer.

Alternatively, when the network connection error occurs and the response for path MTU discovery is not received, the processor 120 may process to change the preset MTU to a second MTU. Herein, the second MTU may be the smallest MTU size available in the electronic device.

The memory 130 may store the instruction or the data received from or generated by one or more components of the electronic device 100 (the processor 120, the user input module 140, the display module 150, and the communication module 160). For example, the memory 130 may store multiple MTU information of the electronic device 100.

The memory 130 may include programming modules including a kernel 131, middleware 132, an Application Programming Interface (API) 133, and an application 134. Each programming module may include one or more of software, firmware, and hardware.

The kernel 131 may control or manage system resources used to execute the operation or the function of the other programming modules (e.g., the middle ware 132, the API 133, and the application 134) of the memory 130. The kernel 131 may provide an interface allowing the middleware 132, the API 133, or the application 134 to access and control or manage the individual component of the electronic device 100. Herein, the system resource may include one or more of the bus 110, the processor 120, and the memory 130.

The middleware 132 may relay data between the API 133 or the application 134 and the kernel 131. The middleware 132 may perform load balancing for work requests received from one or more applications 134.

The middleware 132 allows the application 134 to efficiently utilize the limited system resource of the electronic device 100 through the API 133. The middleware 132 may include a plurality of preset modules for the common function of the application 134.

The API 133 includes an interface for the application 134 to control the kernel 131 or the middleware 132. For example, the API 133 may include one or more interfaces or functions for file control, window control, image processing, or text control.

The user input module 140 may receive and forward the instruction or the data from the user to the processor 120 or the memory 130 via the bus 110. The user input module 140 may include a touch panel, a keypad, and a pen sensor, and generate an input for the shared data setting.

The display module 150 may display an image, a video, or data to the user.

The communication module 160 may connect the communication between other electronic device 102 and the electronic device 100 or between a server 164 and the electronic device 100. The communication module 160 may include a first communication module for connecting the communication to a first auxiliary electronic device, and a second communication module for connecting the communication to a second electronic device. Alternatively, the communication module 160 may include a first communication module for connecting the communication to the second auxiliary electronic device, and a second communication module for connecting the communication to the second electronic device.

The communication module 160 may support a short-range communication protocol (e.g., Wireless Fidelity (Wi-Fi), Bluetooth (BT), Near Field Communication (NFC)), or communication network (e.g., Internet, Local Area Network (LAN), Wire Area Network (WAN), telecommunication network, cellular network, satellite network, or Plain Old Telephone Service (POTS)). The electronic devices 102 and 104 may be the same as or different from the electronic device 100 in type. The other electronic device 102 communicating with the electronic device 100 may be the first auxiliary electronic device, the second auxiliary electronic device, and the second electronic device.

Figure 2:
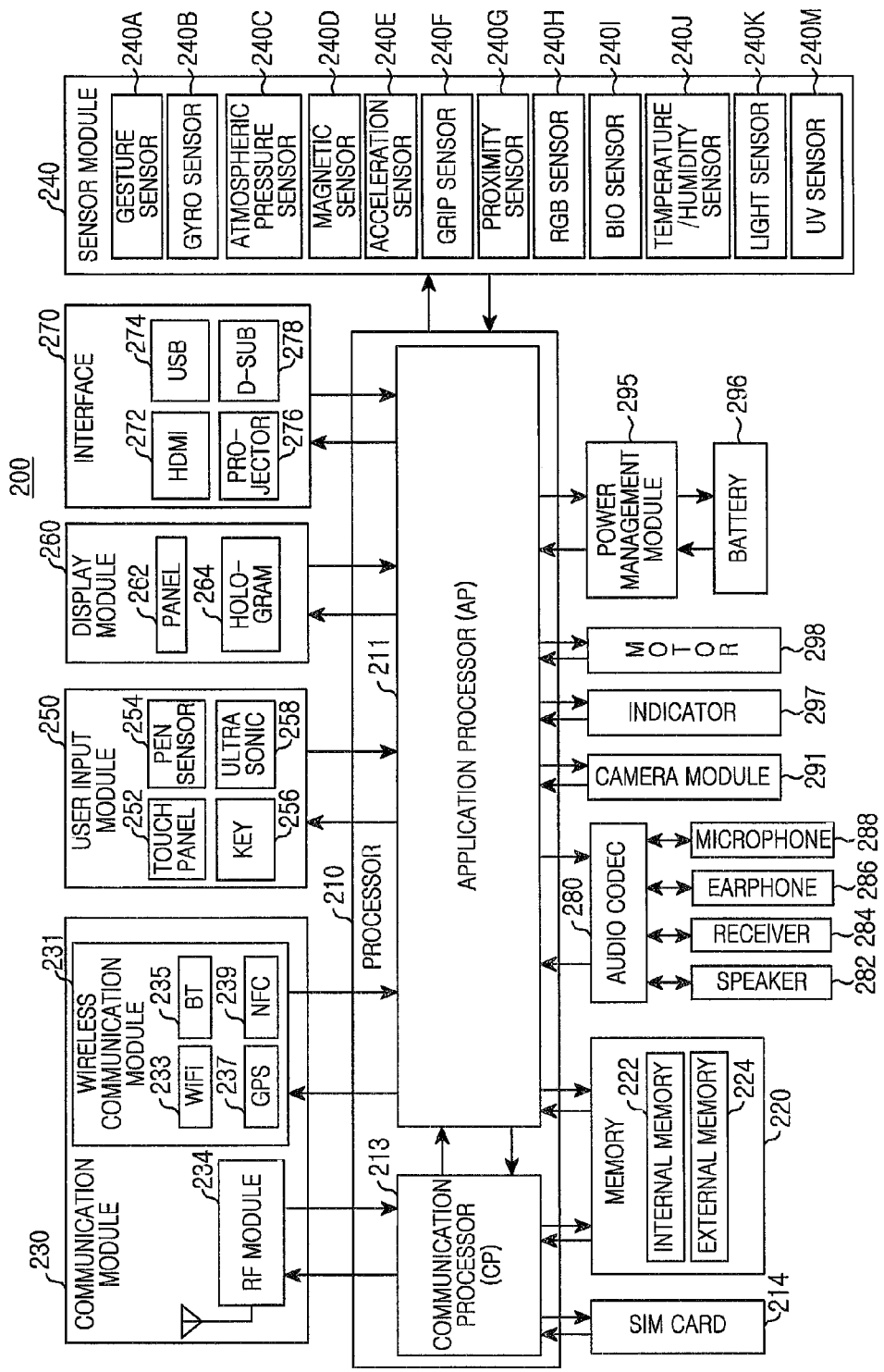
FIG. 2 illustrates a block diagram of the electronic device according to an example embodiment of the present disclosure.

FIG. 2 illustrates a block diagram of an electronic device 200 according to an example embodiment of the present disclosure. The electronic device 200 may be, for example, the electronic device 100 of FIG. 1. Referring to FIG. 2, the electronic device 200 may include one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (e.g., the processor 120) may include one or more Application Processor (APs) 211 and one or more Communication Processors (CPs) 213. While the AP 211 and the CP 213 are included in the processor 210 of FIG. 2, the AP 211 and the CP 213 may be included in different Integrated Circuit (IC) packages. The AP 211 and the CP 213 may be included in the single IC package.

The AP 211 may control hardware or software components connected to the AP 211 by driving an operating system or an application program, and carry out data processing and operations including multimedia data. The AP 211 may be implemented using, for example, a System on Chip (SoC). The processor 210 may further include a Graphic Processing Unit (GPU) (not shown).

The CP 213 may manage data links and convert the communication protocol in the communications between the electronic device 200 and the other electronic devices connected over the network. The CP 213 may be implemented using, for example, a SoC. The CP 213 may perform at least part of a multimedia control function. The CP 213 may identify and authenticate the electronic device in the communication network using the SIM card 214. The CP 213 may provide the user with services including voice call, video call, text message, and packet data.

The CP 213 may control the data transmission and reception of the communication module 230. While the components of the CP 213, the power management module 295, and the memory 220 are separated from the AP 211 in FIG. 2, the AP 211 may include part (e.g., the CP 213) of such components.

The CP 213 may be the processor 120 of FIG. 1.

The AP 211 or the CP 213 may load and process the instruction or the data received from at least one of its non-volatile memory and the other component, in a volatile memory. The 211 AP or the CP 213 may store data received from or generated by at least one of the other components, to the non-volatile memory.

The SIM card 214 may be inserted to a slot formed at a specific location of the electronic device. The SIM card 214 may contain unique identification information (e.g., Integrated Circuit Card Identifier (ICCID)) or subscriber information (e.g., International Mobile Subscriber Identity (IMSI)).

The memory 220 may include an internal memory 222 and an external memory 224. The memory 220 may be, for example, the memory 130 of FIG. 1. The internal memory 222 may include at least one of, for example, the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), Programmable ROM (PROM), Erasable PROM (EPROM), Electrically EPROM (EEPROM), mask ROM, flash ROM, NAND flash memory, NOR flash memory). The internal memory 222 may employ a Solid State Drive (SSD). The external memory 224 may further include, for example, a Compact Flash (CF), a Secure Digital (SD), a Micro-SD, a Mini-SD, an extreme digital (xD), and a memory stick.

The communication module 230 may include a wireless communication module 231 and a Radio Frequency (RF) module 234. For example, the communication module 230 may be the communication module 160 of FIG. 1. For example, the wireless communication module 231 may include a Wi-Fi 233, a BT 235, a GPS 237, and an NFC 239. For example, the wireless communication module 231 may provide a wireless communication function using a radio frequency. Additionally/substantially, the wireless communication module 231 may include a network interface (e.g., LAN card) or a modem for connecting the electronic device 200 to the network (e.g., Internet, LAN, WAN, telecommunication network, cellular network, satellite network, or POTS).

The RF module 234 may control the data transmission and reception, for example, the transmission and reception of the RF signal or the paged electric signal. For example, the RF module 234 may includes a transceiver, a Pulse Amplitude Module (PAM), a frequency filter, or a Low Noise Amplifier (LNA) which are not shown. The RF module 234 may further include a component, for example, conductor or conducting wire, for sending and receiving electromagnetic waves in free space during the wireless communication.

The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a Red Green Blue (RGB) sensor 240H, a biometric sensor 240I, a temperature/humidity sensor 240J, a light sensor 240K, and an UltraViolet (UV) sensor 240M. The sensor module 240 may measure a physical quantity or detect the operation status of the electronic device, and convert the measured or detected information to an electric signal. Additionally/substantially, the sensor module 240 may include, for example, an E-noise sensor (not shown), an electromyography (EMG) sensor (not shown), an electroencephalogram (EEG) sensor (not shown), an electrocardiogram (ECG) sensor (not shown), or a finger print sensor. The sensor module 240 may further include a control circuit for controlling its one or more sensors.

The user input module 250 may include a touch panel 252, a (digital) pen sensor 254, a key 256, and an ultrasonic input device 258. For example, the touch panel 252 may recognize the touch input using at least one of capacitive, resistive, infrared, and Surface Acoustic Wave (SAW) techniques. The touch panel 252 may further include a controller (not shown). The capacitive touch panel may recognize not only the direct touch but also the proximity. The touch panel 252 may further include a tactile layer. In this embodiment, the touch panel 252 may provide a tactile response to the user.

The (digital) pen sensor 254 may be implemented using, for example, the same or similar method as or to the user's touch input, or using a separate recognition sheet. For example, the key 256 may include a keypad or a touch key. The ultrasonic input device 258, which obtains data by detecting microwave through a microphone 288 in the electronic device, allows radio frequency identification through the pen which generates an ultrasonic signal. The electronic device 200 may receive the user input from an external device (e.g., a network, a computer, a server) connected using the communication module 230.

The display module 260 may include a panel 262 or a hologram 264. The panel 262 may employ, for example, a Liquid Crystal Display (LCD) or an Active Matrix Organic Light Emitting Diode (AMOLED). The panel 262 may be implemented, for example, flexibly, transparently, or wearably. The panel 262 may be constructed as the single module with the touch panel 252. The hologram 264 may present a three-dimensional image in the air using interference of light. The display module 260 may further include a control circuit for controlling the panel 262 or the hologram 264.

The interface 270 may include, for example, a High Definition Multimedia Interface (HDMI) 272, a Universal Serial Bus (USB) 274, a projector 276, and a D-subminiature (D-sub) 278. Additionally/substantially, the interface 270 may include, for example, a SD/Multi-Media Card (MMC) or Infrared Data Association (IrDA), which are not shown.

The audio codec 280 may convert the voice to an electric signal and vice versa. For example, the audio codec 280 may convert voice information which is input or output through, for example, a speaker 282, a receiver 284, an earphone 286, or the microphone 288.

The camera module 291 may capture a still picture and a moving picture, and may include one or more image sensors (e.g., front lens or rear lens), an Image Signal Processor (ISP) (not shown), or a flash LED (not shown).

The power management module 295 may manage power of the electronic device 200. For example, the power management module 295 may include a Power Management IC (PMIC), a charger IC, or a battery fuel gauge which is not shown.

The PMIC may be mounted in, for example, an IC or a SoC conductor. The charging type may be divided to a wired type and a wireless type. The charger IC may charge the battery and prevent overvoltage or overcurrent from flowing from the charger. The charger IC may include a charger IC for at least one of the wired charging type or the wireless charging type. The wireless charging type includes, for example, magnetic resonance, magnetic induction, and microwave, and may further include an additional circuit, for example, coil loop, resonance circuit, rectifier circuit, for the wireless charging.

The battery fuel gauge may measure, for example, the remaining capacity of the battery 296 and the voltage, the current, or the temperature of the charging. The battery 296 may supply the power by generating the electricity. For example, the battery 296 may be a rechargeable battery.

The indicator 297 may display a specific status, for example, booting state, message state, or charging state of the hardware 200 or part (e.g., AP 211) of the hardware 200. The motor 298 may convert the electric signal to a mechanic vibration.

Although it is not depicted here, the electronic device 200 may further include a processor (e.g., GPU) for supporting mobile TV. For example, the processor for supporting the mobile TV may process media data in conformity with Digital Multimedia Broadcasting (DMB), Digital Video Broadcasting (DVB), or media flow standard. The aforementioned hardware components may include one or more components, and the names of the corresponding components of the present disclosure may differ according to the type of the electronic device. The hardware of the present disclosure may include at least one of the components, omit some components, or further include other components. Some of the hardware components may be united to the single entity to carry out the same functions of the corresponding components.

Figure 3:
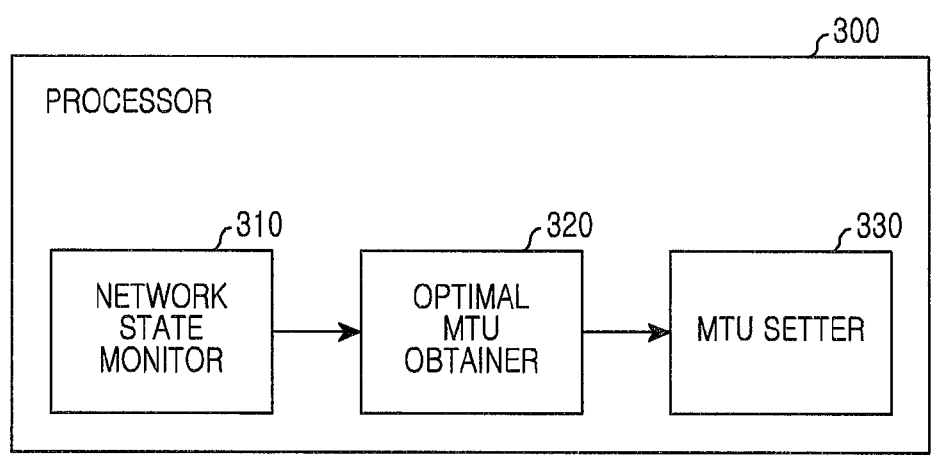
FIG. 3 illustrates a block diagram of a processor for setting an MTU according to an example embodiment of the present disclosure.

FIG. 3 illustrates a block diagram of the processor for setting the MTU according to an example embodiment of the present disclosure.

Referring to FIG. 3, the processor 300, as a source node for obtaining the optimal MTU in the network access, may include a network state monitor 310, an optimal MTU obtainer 320, and an MTU setter 330.

The network state monitor 310 of the processor 300 may checks the network flow, for example, the connection error due to the MTU.

After the IP is allocated, the network state monitor 310 may connect to the network through the handshaking. When the network is successfully connected, the network state monitor 310 may obtain the network flow based on whether the first MTU packet is retransmitted. The first MTU may be the largest MTU size of the MTUs of the source node. When not receiving a response for the transmitted packet, the network state monitor 310 may determine the connection error due to the MTU.

The optimal MTU obtainer 320 may obtain the optimal MTU between the source node and the destination node.

The optimal MTU obtainer 320 may process to obtain the optimal MTU in the IP layer or the application layer when the network connection error occurs.

To obtain the optimal MTU in the IP layer, the optimal MTU obtainer 320 may request a response message of the first MTU packet (e.g., the largest MTU packet available in the source node) from an intermediate node or the destination node. To receive the response message of the first MTU packet, the optimal MTU obtainer 320 may transmit an Internet Control Message Protocol (ICMP) message. The ICMP may include a ping message sent to the intermediate node or the destination node. The optimal MTU obtainer 320 may process not to fragment and transmit the ICMP message to the destination node.

To obtain the optimal MTU in the application layer, the optimal MTU obtainer 320 may request a response message of the second MTU packet (e.g., the smallest MTU packet available in the source node) from the destination node. The optimal MTU obtainer 320 may request the response by sending dummy data to the destination node. The dummy data may be transmitted using Hypertext Transfer Protocol (HTTP) communication. The optimal MTU obtainer 320 requests, but not limited to, the response of the smallest MTU packet. For example, the optimal MTU obtainer 320 may request the response to the packet of the MTU size which is determined sequentially or arbitrarily in the source node.

The optimal MTU obtainer 320 may obtain the optimal MTU based on the response of the packet transmitted in the IP layer or the application layer.

Alternatively, when the network connection error is confirmed, the optimal MTU obtainer 320 may define the smallest MTU size of the source node as the optimal MTU.

The MTU setter 330 may process to change the preset MTU to the optimal MTU acquired by the optimal MTU obtainer 320.

For example, the electronic device may include a memory for storing the MTU value, a communication part for sending the packet of the first preset MTU value to the intermediate node and receiving the response of the packet from the intermediate node, and a processor for sending the packet of the first preset MTU value to the destination node when the network is connected, measuring the optimal MTU value in the IP layer when the packet of the first preset MTU value is not transmitted to the destination node, and processing to change the first preset MTU value to the optimal MTU value measured.

The processor may measure the optimal MTU value by sending the ICMP message to the intermediate node, and determine the failure of the optimal MTU value measurement when a response of the message is not received during a preset time.

When failing in the optimal MTU value measurement in the IP layer, the processor may process to measure the optimal MTU value in the application layer.

The processor may measure the optimal MTU value by requesting the data from the destination node, and determine the failure of the optimal MTU value measurement when a response of the message is not received during a preset time.

When failing in the optimal MTU value measurement in the application layer, the processor may process to change the first preset MTU value to the second preset MTU value. The second MTU value may be smaller than the first MTU value.

Figure 4:
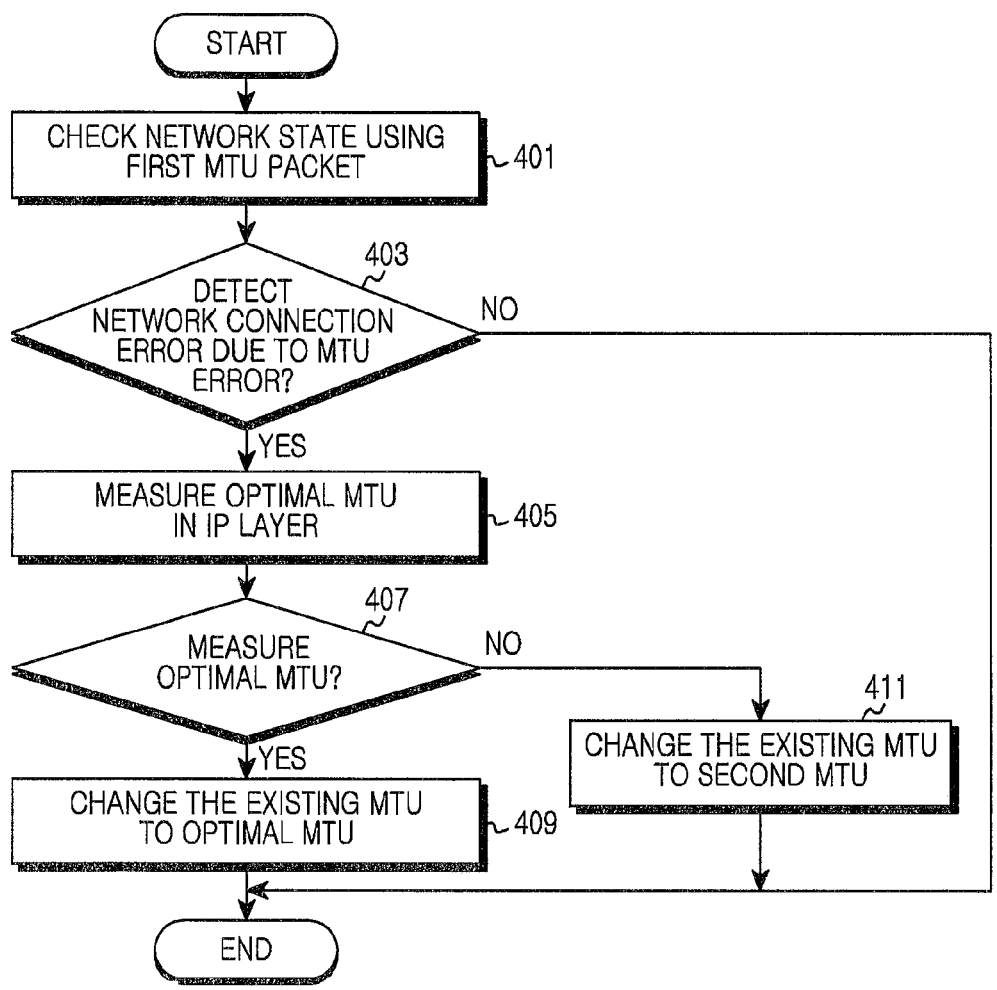
FIG. 4 illustrates a process for setting the MTU in the electronic device according to an example embodiment of the present disclosure.

FIG. 4 illustrates a process for setting the MTU in the electronic device according to an example embodiment of the present disclosure.

Referring to FIG. 4, the electronic device may set at least two hard-coded MTU values. Herein, the MTU corresponds to a provider or a particular area. The MTU may include the first MTU of the largest size and the second MTU of the smallest size in the electronic device.

The electronic device may check the network flow using the first MTU packet in block 401, and determine whether the network connection error occurs due to the MTU error in block 403.

To access the network, the electronic device may, after the IP is allocated, attempt to connect the network through the handshaking. When the network connection is tried, the first MTU packet is transmitted, and then no response is received, the electronic device may determine the network connection error due to the MTU error.

When determining the network connection error due to the MTU error, the electronic device may measure the optimal MTU in the IP layer in block 405.

To receive the response message of the first MTU packet from the intermediate node or the destination node, the electronic device may send the ICMP message. The electronic device may send the ping message corresponding to the first MTU to the intermediate node or the destination node. The electronic device may process not to fragment and send the ICMP message to the destination node. For example, the electronic device may set a Don't Fragment (DF) bit in a header of the ICMP and send it to the intermediate node and the destination node.

In block 407, the electronic device determines whether the optimal MTU is measured in the IP layer. The electronic device may measure the optimal MTU based on whether the response message of the packet sent to the intermediate node or the destination node is received. For example, as the network connection error results from the MTU error, the ICMP message is not transmitted to the destination node. Accordingly, the electronic device may receive the response of the ICMP message from the intermediate node. The response of the ICMP message may notify that the message corresponding to the first MTU may not be sent from the intermediate node to the destination node. Upon receiving the response message, the electronic device may measure the optimal MTU through path MTU discovery.

The response message may not be sent to the electronic device because the response message from the intermediate node is lost. When receiving no response message, the electronic device may not measure the optimal MTU.

When measuring the optimal MTU, the electronic device may change the existing MTU to the optimal MTU measured, for example, the MTU measured by the path MTU discovery in block 409.

When not measuring the optimal MTU, the electronic device may change the existing MTU to the second MTU in block 411. When failing in the optimal MTU measurement, the electronic device may be forced to change to the small MTU.

Figure 5:
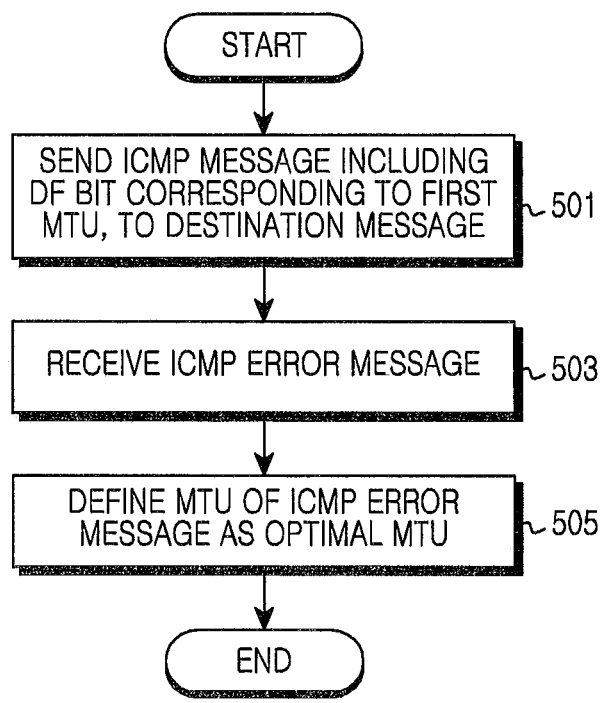
FIG. 5 illustrates a process of measuring an optimal MTU in an IP layer in the electronic device according to an example embodiment of the present disclosure.

FIG. 5 illustrates a process of measuring the optimal MTU in the IP layer in the electronic device according to an example embodiment of the present disclosure.

Referring to FIG. 5, the electronic device may measure the optimal MTU by sending ICMP message. The electronic device may obtain the path MTU based on the response of the ICMP message and use the obtained path MTU as the optimal MTU.

Alternatively, when receiving no response of the ICMP message, the electronic device may use the small MTU as the optimal MTU.

In block 501, the electronic device may send the ICMP message to the destination message using the large MTU. The ICMP message may set the DF bit to avoid the fragmentation at the intermediate node.

In block 503, the electronic device may receive the response message of the ICMP message via the intermediate node. The electronic device may receive an ICMP error message from the intermediate node. The ICMP error message may contain the MTU value of the intermediate node which may not pass the ICMP message because the MTU of the intermediate node is smaller than the MTU of the ICMP message.

In block 505, the electronic device may define the MTU of the intermediate node of the ICMP error message, as the optimal MTU.

Figure 6:
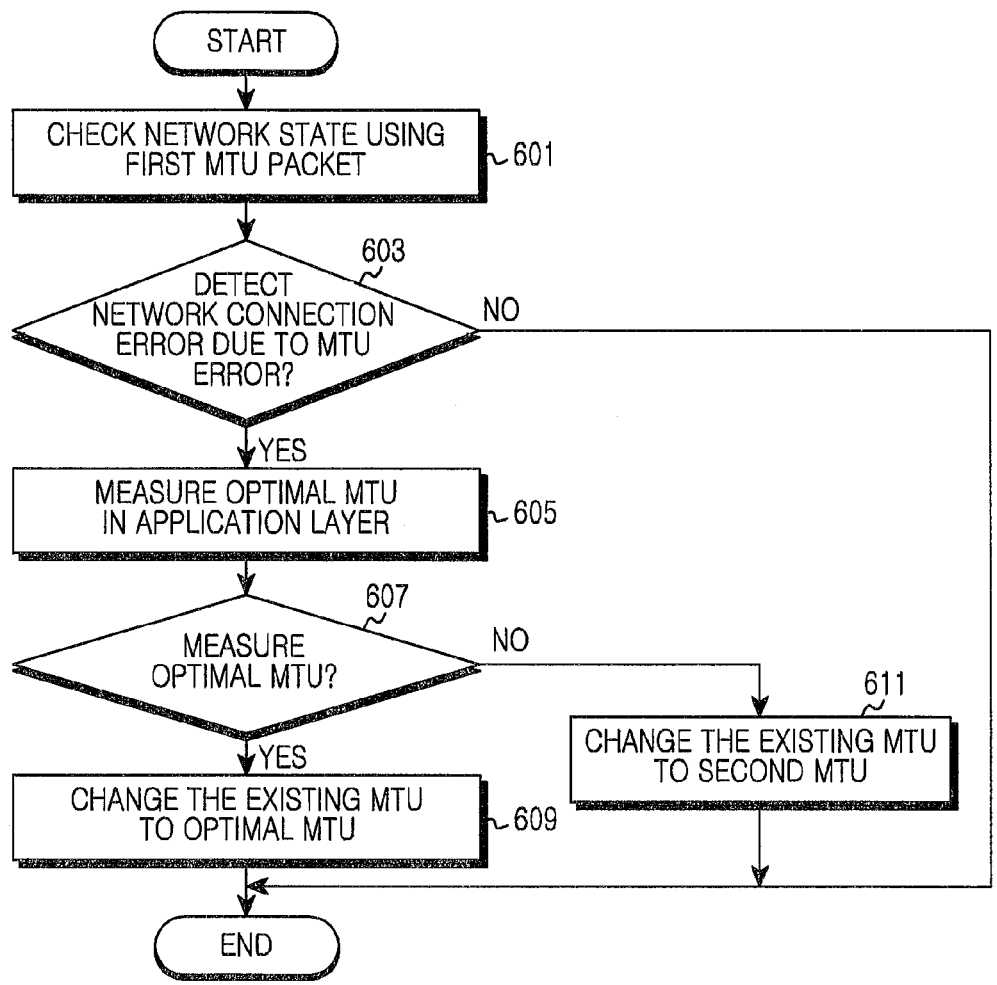
FIG. 6 illustrates a process for setting the MTU of the electronic device according to an example embodiment of the present disclosure.

FIG. 6 illustrates a process for setting the MTU in the electronic device according to an example embodiment of the present disclosure.

Referring to FIG. 6, the electronic device may define at least two MTUs for the network connection. Herein, the MTU may include the first MTU of the largest MTU size corresponding to the provider or the particular area, and the second MTU of the smallest MTU size in the electronic device.

In block 601, the electronic device may check the network state using the first MTU packet.

In block 603, the electronic device may determine whether the network connection error results from the MTU error.

The electronic device may be allocated the IP for the network connection and then attempt to connect the network using the handshaking. Next, the electronic device may send the first MTU packet and confirm the network connection error when no response is received.

Upon confirming the network connection error due to the MTU error, the electronic device may measure the optimal MTU in the application layer in block 605.

The electronic device may receive the response by requesting the dummy data from the destination node. The electronic device may request the dummy data using the HTTP communication. The electronic device may request the dummy data based on a random MTU of the available MTU sizes. For example, the electronic device may request the dummy data sequentially using the available MTUs.

In block 607, the electronic device determines whether the optimal MTU is measured in the application layer. The electronic device may measure the optimal MTU based on whether or not the response message of the packet sent to the destination node is received. For example, upon receiving the response of the dummy data requested to the destination node, the electronic device may define the MTU corresponding to the dummy data request as the optimal MTU.

In block 609, the electronic device may change the existing MTU to the optimal MTU, for example, the MTU corresponding to the dummy data request corresponding to the response.

When not measuring the optimal MTU, the electronic device may change the existing MTU to the second MTU in block 611. When the optimal MTU measurement fails, the electronic device may forcibly change to the small-sized MTU.

Figure 7:
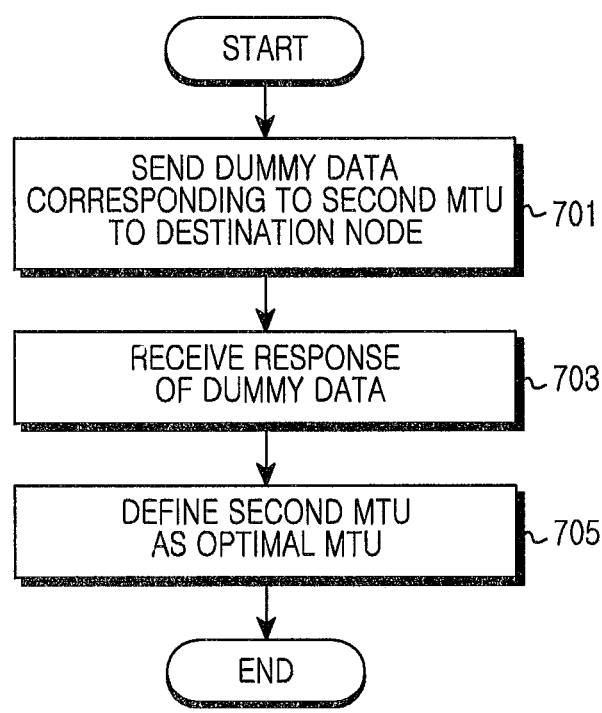
FIG. 7 illustrates a process for measuring the optimal MTU in an application layer in the electronic device according to an example embodiment of the present disclosure.

FIG. 7 illustrates a process for measuring the optimal MTU in the application layer in the electronic device according to an example embodiment of the present disclosure.

Referring to FIG. 7, the electronic device may measure the optimal MTU by requesting the dummy data from the destination node.

In block 701, the electronic device may request the dummy data based on the arbitrary MTU. Herein, when confirming the network connection error due to the MTU error with the first MTU packet, the electronic device may request the dummy data based on the arbitrary MTU excluding the first MTU.

In block 703, the electronic device may receive the response of the dummy data from the destination node. The electronic device may receive the response from the destination node only when the dummy data request corresponding to the random MTU is sent to the destination node.

In block 705, the electronic device may define the MTU corresponding to the dummy data request as the optimal MTU.

Figure 8:
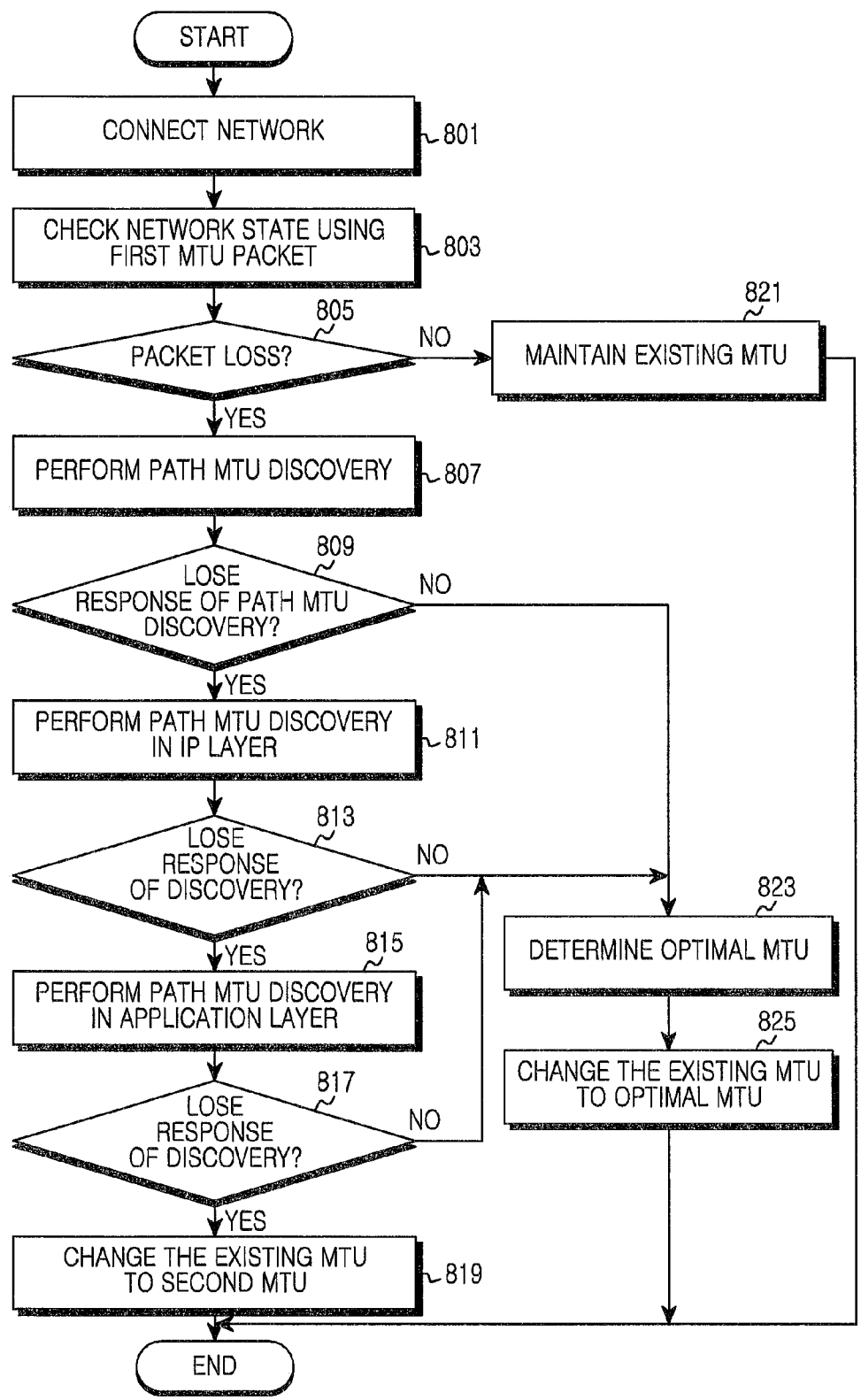
FIG. 8 illustrates a process for setting the MTU of the electronic device according to an example embodiment of the present disclosure.

FIG. 8 illustrates a process for setting the MTU in the electronic device according to an example embodiment of the present disclosure.

Referring to FIG. 8, the electronic device may define at least two MTUs for the network connection. Herein, the MTU may include the first MTU of the greatest MTU size corresponding to the provider or the particular area, and the second MTU of the smallest MTU size in the electronic device.

In block 801, the electronic device may connect the network. After the IP is allocated, the electronic device may connect the network using the handshaking.

In block 803, the electronic device may check the network state. The electronic device may check the network state by sending the first MTU packet.

In block 805, the electronic device may determine whether the first MTU packet is lost. The electronic device may determine whether the packet is lost, based on whether the response of the first MTU packet is received.

When the first MTU packet is not lost, the electronic device may maintain the MTU as the first MTU. That is, the electronic device sets the MTU using the first MTU.

When the first MTU packet is lost, the electronic device may perform the path MTU discovery in block 807.

The electronic device may send the packet corresponding to the largest MTU and conduct the path MTU discovery for confirming the optimal MTU using the response, for example, the ICMP message received from the intermediate node.

In block 809, the electronic device may determine whether the response of the path MTU discovery is lost. Herein, the response loss indicates no response received at the electronic device.

When the response of the discovery is lost, the electronic device may perform the path MTU discovery in the IP layer in block 811.

The electronic device may send the ICMP message to receive the response message of the first MTU packet from the intermediate node or the destination node. For example, the electronic device may send the ping message corresponding to the first MTU to the intermediate node and the destination node. The electronic device may process not to fragment and send the ICMP message to the destination node. For example, the electronic device may set the DF bit in the header of the ICMP and then send the ICMP message to the intermediate node and the destination node.

In block 813, the electronic device may determine whether the response of the path MTU discovery is lost in the IP layer. For example, the electronic device may determine whether the response of the ping message corresponding to the first MTU is received.

When the response of the discovery is not lost in the IP layer, the electronic device may determine the optimal MTU based on the received response in block 823 and change the existing MTU to the optimal MTU in block 825.

When the response of the discovery is lost in the IP layer, the electronic device may perform the path MTU discovery in the application layer in block 815. The electronic device may conduct the path MTU discovery by requesting the dummy data and receiving the response from the destination node.

In block 817, the electronic device may determine whether the response of the path MTU discovery is lost in the application layer. The electronic device may determine whether the response of the dummy data request is received.

When the response of the path MTU discovery is not lost in the application layer, the electronic device may determine the optimal MTU based on the received response in block 823 and change the existing MTU to the optimal MTU in block 825.

When the response is lost in the application layer, the electronic device may change the existing MTU to the second MTU in block 819. When the optimal MTU measurement fails, the electronic device may forcibly change to the smallest MTU.

FIGS. 9A through 9D illustrate the MTU setting in the electronic device according to an example embodiment of the present disclosure.

The electronic device corresponding to the source node may set the optimal MTU for the server being the destination server through the intermediate node (a node A, a node B).

When confirming the network connection error due to the MTU error, the source node may obtain the optimal MTU using the path MTU discovery.

The source node may generate and send a packet corresponding to its MTU size, for example, 1500 bytes to the destination node via the intermediate node.

The intermediate node may compare the packet received from the source node and its MTU and forward the packet to a next intermediate node or the destination node when the received packet is below its MTU.

When the received packet exceeds its MTU, the intermediate node may discard the packet and send the ICMP message to the source node. The ICMP message may contain MTU information of the intermediate node and indicate that the packet from the source node may not be sent to the destination node due to the MTU of the intermediate node.

The source node receiving the ICMP message (910) transmitted by the intermediate node may regenerate a packet according to the MTU of the ICMP message and send the packet (912) to the destination node via the intermediate node.

Figure 9A:
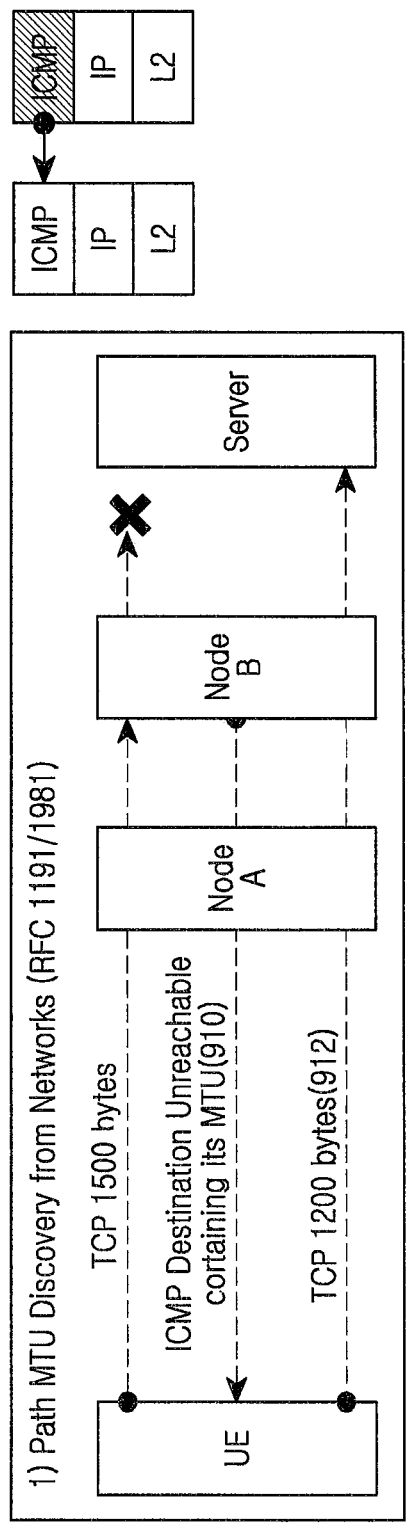
FIGS. 9A-9D illustrate diagrams of the MTU setting in the electronic device according to an example embodiment of the present disclosure.

For example, as shown in FIG. 9A, the path MTU discovery may be carded out based on an ICMP protocol of the IP layer. The optimal MTU is obtained based on the ICMP message sent from the intermediate node.

In an embodiment, when the MTU of the intermediate node and the destination node is smaller than the MTU of the source node, no ICMP message may be received. However, in the event of the network connection error due to the MTU error, the ICMP message needs to be received. No ICMP message reception may indicate the ICMP message loss in the network.

Additionally, after sending the packet of the MTU, the source node may determine whether the ICMP message is received during a predefined time.

When receiving no ICMP message during the predefined time, the source node may send the ICMP message to the intermediate node in order to obtain the optimal MTU.

Figure 9B:
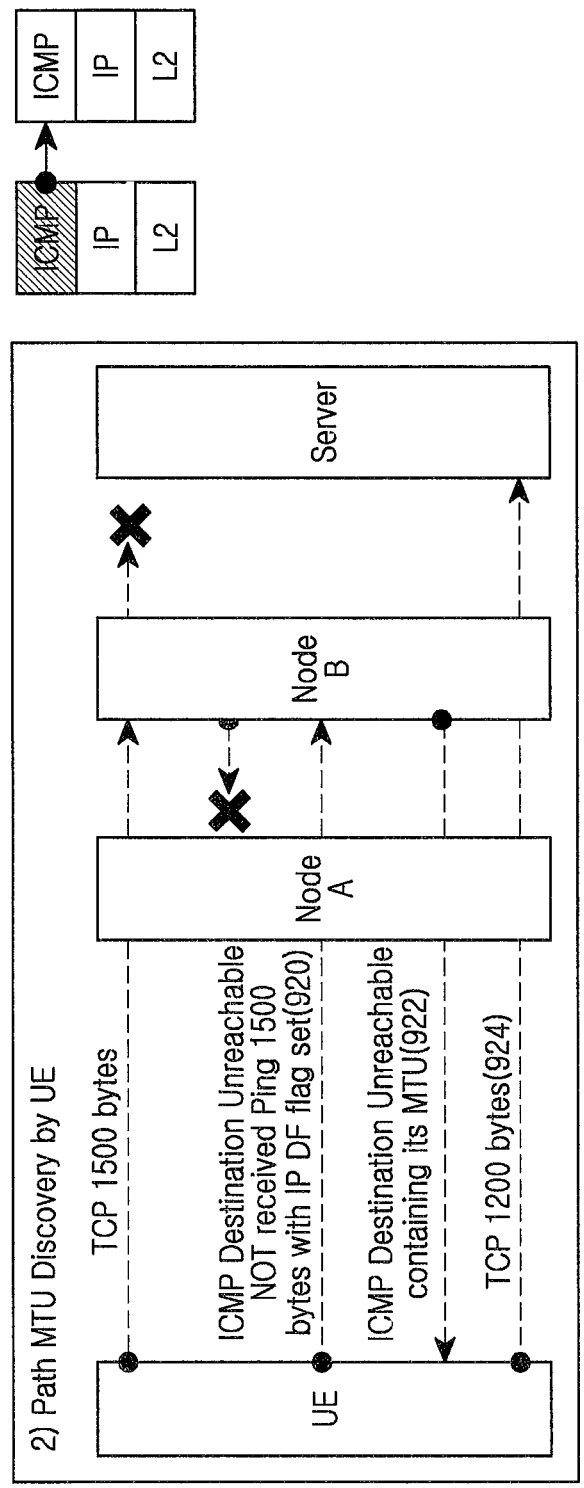

For example, as shown in FIG. 9B, the source node may send the ping message (920) corresponding to the largest MTU to the intermediate node in order to receive the response message of the packet from the intermediate node or the destination node. The source node may process not to fragment the send the ping message to the destination node.

When the received packet exceeds the MTU, the intermediate node may discard the packet and send the ICMP message (922) to the source node. The ICMP message may contain the MTU information of the intermediate node and indicate that the packet from the source node may not be sent to the destination node because of the MTU of the intermediate node.

The source node receiving the ICMP message may regenerate a packet according to the MTU of the ICMP message and send the packet (924) to the destination node via the intermediate node.

Additionally, after sending the packet of the MTU, the source node may determine whether the ICMP message is received during a predefined time.

When receiving no ICMP message during the predefined time, the source node may conduct the path MTU discovery in the application layer.

The source node may conduct the path MTU discovery by requesting the dummy data and receiving the response from the intermediate node.

Figure 9C:
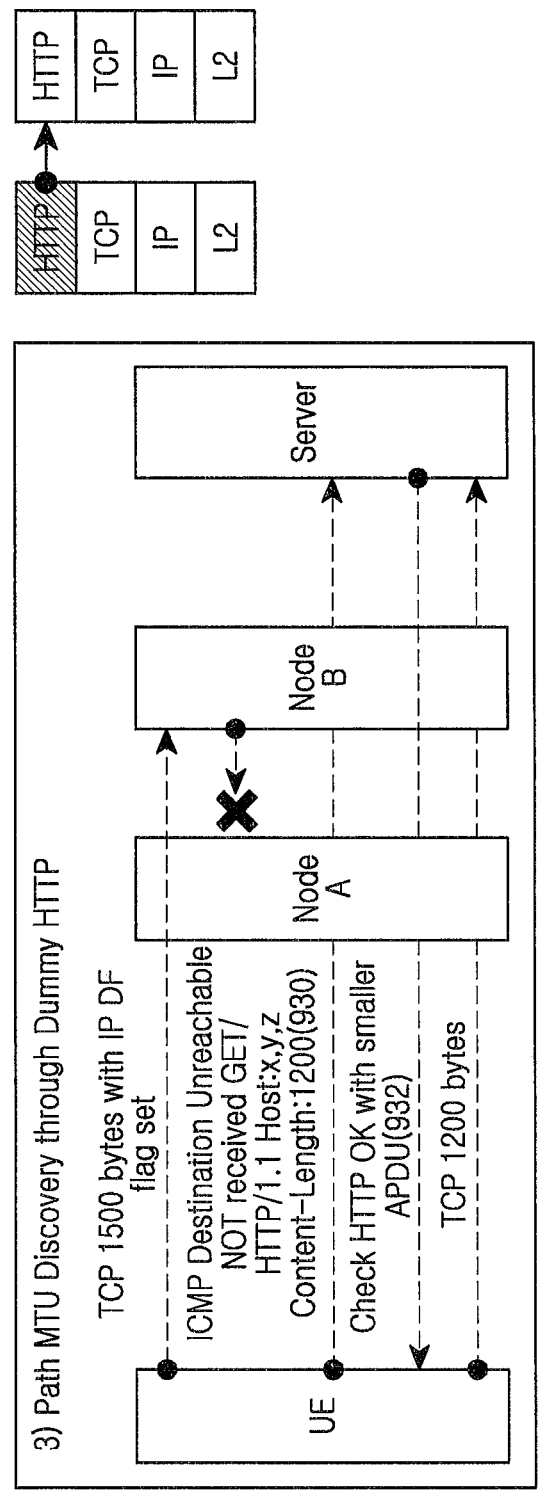

For example, as shown in FIG. 9C, the source node may request (930) the dummy data using the HTTP communication. The source node may obtain the optimal MTU (934) based on the response (932) to the request corresponding to the smallest MTU of the source node.

While the optimal MTU is obtained in order of FIG. 9A. FIG. 9B, and FIG. 9C, the optimal MTU may be obtained through at least one of the operations of FIG. 9.

When the event for measuring the optimal MTU occurs, the source node may acquire the optimal MTU through one of operations of FIGS. 9A, 9B, and 9C.

Figure 9D:
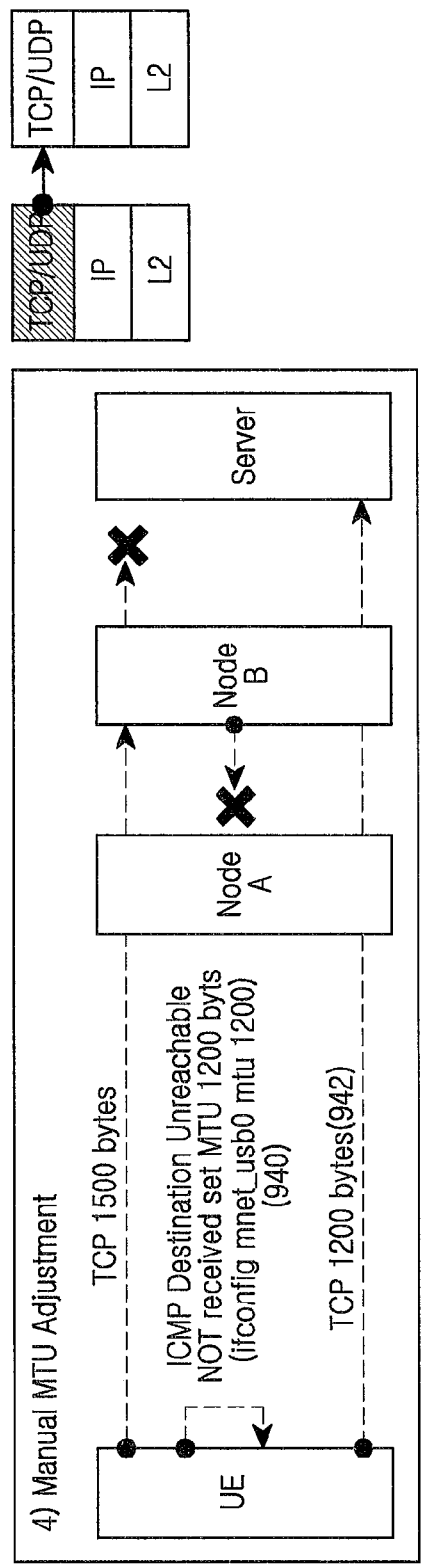

Additionally, as shown in FIG. 9D, in the event of the network connection error due to the MTU error, the source node may generate and send the packet corresponding to its MTU size, for example, 1500 bytes, to the destination node via the intermediate node.

After sending the packet of the MTU, the source node may determine whether the ICMP message is received during a predefined time.

When receiving no ICMP message during the predefined time (940), the source node may change the preset MTU to the MTU of the predefined size (942), for example, the smallest MTU.

A method for processing data in an electronic device may include, in network connection, determining whether to send a packet of a first Maximum Transmission Unit (MTU) value which is preset, a destination node; when the packet of the first preset MTU value is not transmitted to the destination node, measuring an optimal MTU value in an Internet Protocol (IP) layer or an application layer; and changing the first preset MTU to the optimal MTU value measured.

The method may further include, when failing in the optimal MTU value measurement, changing the first preset MTU value to a second MTU value which is predefined, wherein the second MTU value is smaller than the first MTU value.

The measuring of the optimal MTU value in the IP layer may include sending an Internet Control Message Protocol (ICMP) message of the first preset MTU value to an intermediate node; and receiving a response message of the ICMP message from the intermediate node.

The ICMP message sent to the intermediate node may include a ping message.

The ICMP message sent to the intermediate node may include a message which is not to be fragmented and sent to the destination node.

The measuring of the optimal MTU value in the application layer may include sending a data request to the destination node; and receiving a response of the data request from the destination node.

The data request may have an MTU value smaller than the first preset MTU.

The data request may request dummy data from the destination node using Hypertext Transfer Protocol (HTTP) communication.

A computer-readable recording medium may record an application or a program in an electronic device to execute operations for determining whether to send a packet of a first Maximum Transmission Unit (MTU) value which is preset, to a destination node in network connection, when the packet of the first preset MTU value is not transmitted to the destination node, measuring an optimal MTU value in an Internet Protocol (IP) layer or an application layer, and changing the first preset MTU to the optimal MTU value measured.

The computer-readable recording medium may further record an application or a program for, when failing in the optimal MTU value measurement, changing the first preset MTU value to a second MTU value which is predefined.

The computer-readable recording medium may further record an application or a program for, when failing in the optimal MTU value measurement, changing to a second MTU value which is smaller than the first MTU value.

The methods as described in the claims and/or the specification of example embodiments of the present disclosure may be implemented using hardware, software, or a combination of them.

As for the software, a computer-readable storage medium may store one or more programs (software modules). One or more programs stored in the computer-readable storage medium may be configured for execution by one or more processors of the electronic device. One or more programs include instructions for controlling the electronic device to execute the methods according to the example embodiments as described in the claims and/or the specification of the present disclosure.

Such a program (software module, software) may be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, LAN, WLAN, or Storage Area Network (SAN), or a communication network by combining these networks. The storage device may access the present electronic device through an external port.

A separate storage device in a communication network may access the present electronic device.

As set forth above, in the network access, the electronic device may enhance the data communication performance by obtaining and setting the optimal MTU as its MTU.

While the disclosure has been shown and described with reference to certain example embodiments thereof, it will be understood by those skilled in the art that various changes in form and details may be made therein without departing from the spirit and scope of the disclosure as defined by the appended claims and their equivalents.

What is claimed is:

1. A method for processing data in an electronic device, comprising:
    transmitting a packet of a first Maximum Transmission Unit (MTU) value that is preset to a destination node;
    determining whether a response message about the packet of the first MTU value is received;
    transmitting, to the destination node, at least one of an internet control message protocol (ICMP) message based on the first MTU value and a dummy data request message based on a second MTU value, if the response message is not received; and
    determining an optimal MTU based on a response about the at least one of the ICMP message and the dummy data request message,
    wherein transmitting, to the destination node, at least one of a ICMP message based on the first MTU value and a dummy data request message based on a second MTU value comprises:
        transmitting the ICMP message based on the first MTU value to the destination node;
        determining whether a response message of the ICMP message is received; and
        transmitting the dummy data request message based on the second MTU value if the response message of the ICMP message is not received.

2. The method of claim 1, wherein the determining of the optimal MTU comprises:
    determining whether a response message about the at least one of the ICMP message and the dummy data request message is received; and
    determining the optimal MTU based on a third MTU value that is predefined if the response message about the at least one of the ICMP message and the dummy data request message is not received,
    wherein the third MTU value is smaller than the first MTU value.

3. The method of claim 1, wherein the determining of the optimal MTU comprises:
  receiving a response message of the ICMP message from an intermediate node; and
  determining the optimal MTU based on a fourth MTU value of the intermediate node included in the response message.

4. The method of claim 3, wherein the ICMP message comprises a ping message, and
  wherein the response message of the ICMP message comprises ICMP error message.

5. The method of claim 3, wherein the ICMP message comprises information indicating that the ICMP message is not to be fragmented.

6. The method of claim 1, wherein the second MTU value is smaller than the first MTU value.

7. The method of claim 1, wherein the dummy data request message is transmitted based on Hypertext Transfer Protocol (HTTP) communication.

8. An electronic device comprising:
  a memory;
  a communication part; and
  a processor configured to control the communication part to transmit a packet of a first Maximum Transmission Unit (MTU) value that is preset to a destination node, determine whether a response message about the packet of the first MTU value is received, control the communication part to transmit an internet control message protocol (ICMP) message based on the first MTU value to the destination node if the response message is not received, determine whether a response message of the ICMP message is received, control the communication part to transmit a dummy data request message based on a second MTU value if the response message of the ICMP message is not received, and determine an optimal MTU based on a response about the dummy data request message.

9. The electronic device of claim 8, wherein the processor is configured to determine whether a response message about the at least one of the ICMP message and the dummy data request message is received, and determine the optimal MTU based on a third MTU value that is predefined if the response message about the at least one of the ICMP message and the dummy data request message is not received,
  wherein the third MTU value is smaller than the first MTU value.

10. The electronic device of claim 8, wherein the processor is configured to control the communication part to receive a response message of the ICMP message from an intermediate node, and determine the optimal MTU based on a fourth MTU value of the intermediate node included in the response message.

11. The electronic device of claim 8, wherein the ICMP message comprises information indicating that the ICMP message is not to be fragmented.

12. A non-transitory computer-readable recording medium for recording an application or a program in an electronic device to execute operations for transmitting a packet of a first Maximum Transmission Unit (MTU) value that is preset to a destination node, determining whether a response message about the packet of the first MTU value is received, transmitting an internet control message protocol (ICMP) message based on the first MTU value to the destination node, if the response message is not received, determining whether a response message of the ICMP message is received, transmitting a dummy data request message based on a second MTU value if the response message of the ICMP message is not received, and determining an optimal MTU based on a response about the dummy data request message.

13. The non-transitory computer-readable recording medium of claim 12, wherein determining of the optimal MTU comprises executing the operations for:
  determining whether a response message about the at least one of the ICMP message and the dummy data request message is received; and
  determining the optimal MTU based on a third MTU value that is predefined if the response message about the at least one of the ICMP message and the dummy data request message is not received,
  wherein the third MTU value is smaller than the first MTU value.

14. The non-transitory computer-readable recording medium of claim 13, wherein the second MTU value is smaller than the first MTU value.

15. The non-transitory computer-readable recording medium of claim 12, wherein determining of the optimal MTU comprises executing the operations for:
  receiving a response message of the ICMP message from an intermediate node; and
  determining the optimal MTU based on a fourth MTU value of the intermediate node included in the response message.

16. The non-transitory computer-readable recording medium of claim 15, wherein the ICMP message comprises a ping message, and
  wherein the response message of the ICMP message comprises ICMP error message.

17. The non-transitory computer-readable recording medium of claim 16, wherein the ICMP message comprises information indicating that the ICMP message is not to be fragmented.

* * * * *